(12) United States Patent
Mandal et al.

(10) Patent No.: US 8,628,701 B2
(45) Date of Patent: Jan. 14, 2014

(54) METHOD OF MICRO-ENCAPSULATION

(75) Inventors: Tarun K. Mandal, Kenner, LA (US); Richard Graves, Arabi, LA (US)

(73) Assignee: Xavier University of Louisiana, New Orleans, LA (US)

( * ) Notice: Subject to any disclaimer, the term of this patent is extended or adjusted under 35 U.S.C. 154(b) by 1207 days.

(21) Appl. No.: 11/591,028

(22) Filed: Oct. 31, 2006

(65) Prior Publication Data

US 2008/0099938 A1 May 1, 2008

(51) Int. Cl.
*B01J 13/04* (2006.01)
*B32B 9/00* (2006.01)

(52) U.S. Cl.
USPC ........ 264/4.1; 428/402; 428/402.1; 428/402.2

(58) Field of Classification Search
USPC .............. 264/4.1, 4; 516/54; 428/402, 469, 2, 428/402.2, 402.21, 407, 403, 423.1, 474.4; 424/426, 423, 55, 93.7, 184.1, 497, 424/489, 501, 490, 491, 492, 493, 494, 424/495; 427/389.9, 213.3–213.36, 483; 521/57, 56, 76, 142
See application file for complete search history.

(56) References Cited

U.S. PATENT DOCUMENTS

| | | | |
|---|---|---|---|
| 5,716,640 A | 2/1998 | Kamei et al. | |
| 5,814,342 A | 9/1998 | Okada et al. | |
| 6,238,702 B1 * | 5/2001 | Berde et al. | 424/489 |
| 6,270,700 B1 * | 8/2001 | Ignatious | 264/4.1 |
| 6,383,478 B1 | 5/2002 | Prokop et al. | |
| 6,572,894 B2 * | 6/2003 | Rossling et al. | 424/497 |
| 6,743,446 B2 | 6/2004 | Schwendeman et al. | |
| 6,884,435 B1 * | 4/2005 | O'Hagan et al. | 424/489 |
| 7,041,320 B1 * | 5/2006 | Nuwayser | 424/497 |
| 2004/0105821 A1 * | 6/2004 | Bernstein et al. | 424/46 |
| 2004/0115277 A1 * | 6/2004 | Kissel et al. | 424/489 |
| 2004/0176402 A1 * | 9/2004 | Oshlack et al. | 514/282 |
| 2004/0202669 A1 * | 10/2004 | O'Hagan | 424/184.1 |
| 2005/0048115 A1 * | 3/2005 | Mangena et al. | 424/469 |
| 2006/0228420 A1 * | 10/2006 | Martin | 424/489 |

OTHER PUBLICATIONS

Sobel et al. Open-label trial of an injection depot formulation of buprenorphine in opioid detoxification, 2004, Drug and Alcohol Dependence, vol. 73, pp. 11-22.*
Graves, R.A. et al. Effect of surfactant on the characterisitcs of biodegradable microcapsules, 2005, J. Biomater. Sci. Polymer Edn, vol. 16, No. 5, pp. 585-596.*
Pamujula et al. "prepartation of in vitro characterization of amifostine biodegradable microcapsules" European Journal of Pharmaceutics and biopharmaceutics (2004) vol. 57, 213-218.*
ISP Hallcrest. "Microencapsulation" and "Complex Coacervation." http://www.ispcorp.com.
Ronald J. Versic, Ph.D. "Coacervation for Flavor Encapsulation." http://www.rtdodge.com/coacer.html.
Southwest Research Institute. http://swri.edu/4org/d01/microenc.microen/default.htm.
Ronald T. Dodge Company. http://www.rtdodge.com/technologies.html.
Southern Research Institute. http://www2.southernresearch.org.
Southwest Research Institue. http://www.swri.edu/default.htm.
Vasishtha, Niraj, Ph.D. "Microencapsulation: Delivering a Market Advantage". http://www.preparedfoods.com.
Wikipedia, the free encyiclopedia. "Interfacial Polymerization". http://en.wikipedia.org.
Maehr, Caroline, Jean-Antoine Meiners, Klaus Eichler. "Encapsulation Techniques Spray Drying". http://www.ncapsolutions.com.
Coating Place Inc. http://www.encap.com/articles.htm.
Wikipedia, the free enclyclopedia. "In-Situ polymerization". http://en.wikipedia.org.
Frost and Sullivan. "Developments in Pharmaceutical Microencapsulation in the United States", Sep. 16, 2003. http://www.frost.com.
Wikipedia, the free enclyclopedia. "Techniques to Manufacture Microcapsules". http://en.wikipedia.org.
http://www.rand.org/scitech/radius.
Yeo, Y., Chen, Au., Basaran, Oa., Park, K. "Solvent exchange method: a novel microencapsulation technique using dual microdispensers". Aug. 2004.http://www.ncbi.nlm.nih.gov.
Schwendeman, S.P. "Stability of Proteins encapsulated in Poly(lactic-co-glycolic acid) Delivery Systems". Dept. of Pharmaceutical Sciences, University of Michigan, Ann Arbor.
Luo, Dan; Scott, Norm R. "Sustained Release of Porcine Somatotropin (pst) Gene Protein from biocompatible and biodegradable polymeric nanospheres". http://www.asabe.org.
Biotek, Inc. "Microlayered Erthripoietin Implants". http://www.zapconnect.com.
Mandel, Tarun K. "Development of Biodegradable Drug Delivery System to Treat Addiction". Drug Addiction and Industrial Pharmacy, 25 (6),773-779, 1999 Marcel Dekker, Inc.
Mandal,Tarun K., Bostanian, Levon A., Graves, Richard A., Chapman, Sharlene R. "Poly(d,l-Lactide-Co-Glycolide)Encapsulated Poly (Vinyl Alcohol)Hydrogel as a Drug Delivery System". Pharmaceutical Research, vol. 19, No. 11, Nov. 2002, Plenum Publishing Corp.
Bodmeier, Roland and McGinty, James W. "The Preparation and Evaluation of Drug-Containing Poly(dl-lactide)Microspheres Formed by the Solvent Evaporation Method". Pharmaceutical Research, vol. 4, No. 6, 1987, Plenum Publishing Corp.
Bodmeier, Roland and McGinty, James W. "Polyactic acid microspheres containing quindine base and quindine sulphate prepared by the solvent evaporation technique" J.Microencapsulation, 1987, vol. 4, No. 4, 289-297.
Mandal,Tarun K. and Tenjarla,Srini."Preparation of biodegradable microcapsules of zidovudine using solvent evaporation:Effect of the modification of aqueous phase". International Journal of Pharmaceutics 137 (1996)187-197 Elsevier Science B.V.

\* cited by examiner

*Primary Examiner* — James J Seidleck
*Assistant Examiner* — S. Camilla Pourbohloul
(74) *Attorney, Agent, or Firm* — Miles & Stockbridge P.C.

(57) ABSTRACT

A method of preparing micro-capsules. The active ingredient, preferably provided in the form of an acid salt dissolved in a basic aqueous solution, is emulsified into a polymer solution, preferably PLGA in a relatively volatile solvent such as dichloromethane, to create a water in oil emulsion. This emulsion is further emulsified into an aqueous solution having a pH of a between about 7.4 and 8.0 and most preferably between about 7.8 and 8.0 to create a water in oil in water solution. The polymer solvent is allowed to evaporate, causing the emulsified active ingredient and surrounding polymer matrix to precipitate, thereby forming the micro-capsules. The micro-capsules are separated from the suspension, washed and freeze dried. The method has a very high encapsulation efficiency, even at high loading rates. Additionally, the dissolution rate of the micro-particles produced by the method is very steady over a long period of time.

45 Claims, 17 Drawing Sheets

Figure 1

Efficiency of Encapsulation* vs. pH @ constant Drug Loading (5%)

| Batch | pH | Efficiency of Encapsulation(%), Mean (±SD) (n=3) |
|---|---|---|
| A | 6.4 | 35 |
| B | 7.0 | 37 |
| C | 7.4 | 59 |
| D | 7.8 | 89 |
| E | 8.0 | 95 |
| F | 8.4 | 43 |

* Efficiency of encapsulation = (drug loading experimental)/(drug loading theoretical) x 100

Figure 2

Efficiency of Encapsulation* vs. Drug Loading @ constant pH (8.0)

| Batch | Drug Loading (%) (Wt. Drug/Wt. PLGA) | Efficiency of Encapsulation (%), Mean (±SD) (n=3) |
|---|---|---|
| G | 5 | 95 |
| H | 10 | 97 |
| I | 20 | 110 |
| J | 30 | 87 |
| K | 40 | 88 |
| L | 50 | 70 |

* Efficiency of encapsulation = (drug loading experimental)/(drug loading theoretical) x 100

Figure 3A

Rate of In Vitro Release of Buprenorphine @ 37° C and pH 8.0

| Batch | Drug Loading (%) (Wt. Drug/Wt. PLGA) | Release Rate (μg drug per day per mg of micro-capsule) Days 1-5 | Release Rate (μg drug per day per mg of micro-capsule) Days 5-20 |
|---|---|---|---|
| G | 5 | 0.75 | 0.41 |
| H | 10 | 1.41 | 0.49 |
| I | 20 | 1.42 | 0.57 |
| J | 30 | 0.72 | 0.48 |
| K | 40 | 0.73 | 0.44 |
| L | 60 | 1.16 | 0.78 |
| M* | 20 | 3.15 | 0.37 |
| N** | 20 | 2.03 | 0.51 |

\* Tris Buffer; ** Borate Buffer

Figure 3B

Rate of In Vitro Release of Buprenorphine @ 37° C and pH 8.0

| Batch | Drug Loading (%) (Wt. Drug/Wt. PGA) | Release Rate (μg drug per day per mg of micro-capsule) Days 20-70 | Release Rate (μg drug per day per mg of micro-capsule) Days 70-155 |
|---|---|---|---|
| G | 5 | 0.37 | 0.15 |
| H | 10 | 0.44 | 0.20 |
| I | 20 | 0.47 | 0.21 |
| J | 30 | 0.29 | 0.45 |
| K | 40 | 0.27 | 0.45 |
| L | 60 | 0.34 | 0.52 |
| M* | 20 | 0.36 | 0.24 |
| N** | 20 | 0.49 | 0.36 |

\* Tris Buffer; ** Borate Buffer

Encapsulation Efficiency vs pH

Encapsulation Efficiency vs Drug Loading

METHOD OF MICRO-ENCAPSULATION

GOVERNMENTAL INTEREST

Part of the work during the development of this invention was made with government support under Grant Number R15 DA 13512-01A2 awarded by the National Institutes of Health. The U.S. Government has certain rights in the invention.

BACKGROUND OF THE INVENTION

1. Field of the Invention

The invention pertains to micro-encapsulation in general and micro-encapsulation of buprenorphine in particular.

2. Prior Art

Buprenorphine is an opioid commonly used to treat withdrawal symptoms in patients attempting to cease the use of opiates such as heroin, oxycodone, hydrocodone, and morphine. There is some indication of its efficacy in treating cocaine addiction as well. Mello N K, Mendelson J H, Lukas S E, Gastfriend D R, Teoh S K, Holman B L. *Buprenorphine Treatment of Opiate and Cocaine Abuse: Clinical and Preclinical Studies*. Harv Rev Psychiatry 1993 September-October; 1(3): 168-83.

Buprenorphine is also used as an analgesic, and there is indication that it is well suited for treating certain types of depression. Bodkin J A, Zornberg G L, Lukas S E, Cole J O. *Buprenorphine Treatment of Refractory Depression*. Journal of Clinical Psychopharmacology 1995; 15:49-57.

Buprenorphine is generally administered via intramuscular injection, intravenous infusion, transdermal patch, or sublingual tablet. Buprenorphine is generally not administered orally. When compared to another common drug used to treat opiate addiction, methadone, buprenorphine is relatively long lasting. It has a mean elimination half-life of 34.6 hours. As a result, buprenorphine can often be administered every other day, whereas methadone typically must be administered at least once a day.

The need to administer any drug used for the treatment of narcotic addiction every day or every other day has the potential to cause problems. In the U.S., patients can be prescribed up to a thirty day supply of buprenorphine. This places the recovering addict in the position of having to decide whether to take his buprenorphine or not. The nature of opiate addiction being what it is, poor decisions in this regard by the recovering addict/patient are not uncommon.

One of the advantages of buprenorphine is the strength with which it binds to the receptors in the brain as compared to other opiates. One result of this is that when the patient has a sufficient amount of buprenorphine in his system, it will be difficult to impossible for him to achieve a high by taking other opiates. While on buprenorphine, taking illicit opiates becomes largely pointless for the recovering addict: withdrawal symptoms are substantially alleviated and the narcotic effects of the illicit opiate are blocked. This is believed to make it easier for the recovering addict to resist the temptation to resume consumption of opiates. However, to achieve these advantages, the recovering addict must have the buprenorphine in his system. If he neglects to take his buprenorphine, especially early in his treatment regimen, he can become particularly vulnerable to the pressures that can lead to resumption of illicit opiate consumption.

The present invention contemplates delivering buprenorphine in a micro-encapsulated form. As used herein, the terms micro-encapsulation and micro-capsules refer to particles having a diameter from about 1 micron to about 1000 microns. Micro-encapsulation of drugs is known. However, the process is usually quite inefficient. A large amount of drug is often lost during the encapsulation process. Losses as high as ninety percent are not uncommon.

Once formed, the micro-capsules will often not release the drugs they contain at a steady rate. Rather, a high rate of release is often experienced either initially or after the micro-capsules have been in an aqueous environment for some time. These "burst" effects can result in a significant amount of the drug becoming available to the patient at one time, which complicate the use of such micro-capsules as a drug delivery system.

In view of the foregoing, a system for delivering buprenorphine meeting the following objectives is desired.

OBJECTS OF THE INVENTION

It is an object of the invention to provide a method for releasing buprenorphine at a steady rate over time.

It is another object of the invention to provide a method for releasing buprenorphine without an initial burst of drug being introduced into the system.

It is still another object of the invention to provide a method for efficiently encapsulating buprenorphine.

It is yet another object of the invention to provide a method for encapsulating buprenorphine in which losses of the drug during encapsulation are minimized.

SUMMARY OF THE INVENTION

A method of preparing micro-capsules is disclosed. The active ingredient, preferably provided in the form of an acid salt dissolved in de-ionized water, is emulsified into a polymer solution, preferably PLGA in a relatively volatile solvent such as dichloromethane to create a water in oil emulsion. This emulsion is further emulsified into an aqueous solution having a pH of a between about 7.4 and 8.0 and most preferably between about 7.8 and 8.0 to create a water in oil in water emulsion. The polymer solvent is allowed to evaporate, causing the emulsified active ingredient and surrounding polymer matrix to precipitate, thereby forming the micro-capsules. The micro-capsules are separated from the suspension, washed and freeze dried The method provides for very efficient encapsulation, with losses of less than twenty percent in the preferred pH ranges. This remains true, even at very high drug loading rates. When drug loading rates increase to levels as high as fifty percent, encapsulation losses are only about thirty percent when the emulsions are formed under the desired pH conditions. Moreover, in vitro testing indicates that the resulting micro-capsules release their active ingredients at very steady rates. This substantially constant release rate was observed to hold over several months.

BRIEF DESCRIPTION OF THE FIGURES

FIG. 1 is a table illustrating the efficiency of encapsulation achieved under a preferred embodiment of the invention with drug loading held at a constant level and varying pH.

FIG. 2 is a table illustrating the efficiency of encapsulation achieved under a preferred embodiment of the invention with pH held constant and varying drug loading.

FIG. 3A is a table illustrating the in vitro rate of release, during the first twenty days of an experiment, of a drug encapsulated according to a preferred embodiment of the invention.

FIG. 3B is a table illustrating the in vitro rate of release, during days 21 through 155 of an experiment, of a drug encapsulated according to a preferred embodiment of the invention.

DETAILED DESCRIPTION OF THE BEST MODE

Figure 4:
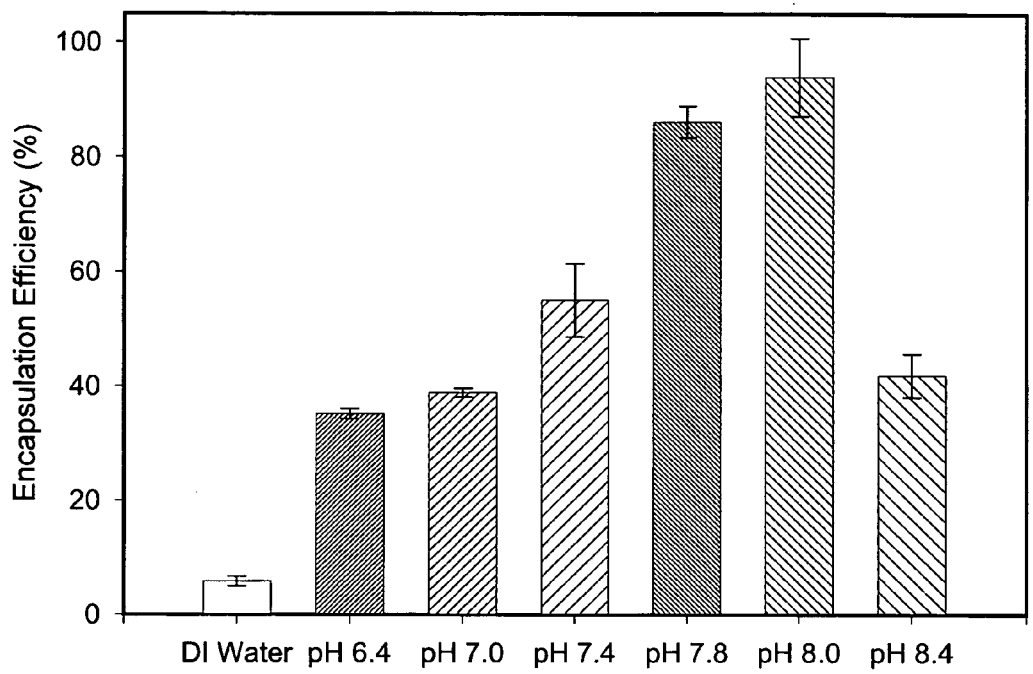
FIG. 4 is a graph illustrating the efficiency of encapsulation achieved under a preferred embodiment of the invention with drug loading held at a constant level and varying pH.

The preferred embodiment comprises a micro-encapsulation of buprenorphine. In forming this micro-encapsulation, a biodegradable aliphatic polyester solution is first formed. The preferred polyester is poly(lactide-co-glycolide acid) or PLGA. Other polymers could be used, but PLGA is preferred because it is already approved for use in humans by the U.S. Food and Drug Administration. Other biodegradable polymers suitable for use in pharmaceutical applications include polycaprolactone, polylactide, and polyphosphazene. Non-biodegradable polymers suitable for non-pharmaceutical applications include methacrylic acid derivatives and cellulose acetate phthalate.

The preferred polymer solution is formed by dissolving one gram of PLGA in ten milliliters (ml) of dichloromethane. Other organic solvents, such as acetone, chloroform, methanol, and ethanol could be used as well. To this solution, two hundred microliters (μL) of L-α phosphatidyl choline surfactant are preferably added, providing a solution in which the surfactant comprises 0.05 percent by weight of the solution.

Next, an aqueous solution or suspension of buprenorphine is formed. In the preferred embodiment, a burenorphine salt of hydrochloric acid is used. To maximize efficiency, a saturated buprenorphine solution is formed or excess buprenorphine is added to a saturated buprenorphine solution to create a suspension of buprenorphine in a saturated buprenorphine solution.

The aqueous buprenorphine solution (or buprenorphine suspension in buprenorphine solution) is then emulsified into the polymer solution. Standard emulsification techniques, comprising subjecting the combined mixture to high pressure sonication for about fifteen to thirty seconds, are used. The result is a (water in oil) emulsion of buprenorphine in PLGA. When a buprenorphine suspension in a buprenorphine solution is used, the result will be a water in oil emulsion and a solid in oil colloid.

Next, an aqueous solution comprising about two hundred ml of deionized water and 0.3 percent by weight surfactant, preferably polyvinyl alcohol, is formed. The quantity of water used can vary from about one hundred ml to about five hundred ml, as convenient, but two hundred ml is typically sufficient. A pH buffer is added to adjust the pH of the solution. The preferred pH buffer is phosphate, but other non-toxic pH buffers, such as Tris (hydroxymethyl aminomethane) or borate, are expected to be suitable. A pH of between about 6.4 and about 8.4 has been found to positively effect the encapsulation efficiency. Substantial improvements in efficiency have been observed between a pH of about 7.4 and about 8.0, with the most significant improvement seen between about 7.8 and about 8.0. Thus, the preferred pH will be 8.0.

At room temperature (25° C.), the water in oil emulsion (or emulsion/colloid mixture) is slowly added to the polyvinyl alcohol solution. Preferably this is done by adding one ml of the PLGA/buprenorphine emulsion to the polyvinyl alcohol solution every minute and stirring continuously with a magnetic stirrer operating at about two hundred to three hundred rotations per minute (rpm). This will form a water in oil in water emulsion (or solid in oil in water colloid), with the buprenorphine being the internal water phase (or internal solid phase), the PLGA being the intermediate oil phase, and the water in the polyvinyl alcohol solution being the external water phase.

The water in oil in water emulsion (or solid in oil in water colloid) is next allowed to stand for about three hours at room temperature and with constant stirring. This will allow the dichloromethane to evaporate. The dichloromethane is the solvent for the PLGA, and without it present, the PLGA will precipitate. Because the PLGA is the external phase of the buprenorphine/PLGA emulsion, precipitation of the PLGA will cause the emulsified buprenorphine micro-capsules to precipitate as well. After the dichloromethane evaporates, the micro-capsules will be dispersed in the aqueous solution.

The aqueous solution/micro-capsule dispersion is then centrifuged at about three thousand rpm for about fifteen minutes. Once the centrifuge process is complete, the micro-capsules will have accumulated at the bottom of the centrifuge tubes, and the aqueous solution can be poured off.

The micro-capsules are then washed with de-ionized water to remove any polyvinyl alcohol that may remain. Three to four washes are typically sufficient. Finally, the washed micro-capsules are freeze dried for about twelve to twenty-four hours to remove any remaining water. The resulting product is a dry powder-like substance comprising buprenorphine/PLGA micro-capsules.

The inventor contemplates that the micro-capsules will be used by dispersing them in a saline solution and injecting them into a patient, either intramuscularly or subcutaneously. A twenty gauge needle is expected to be sufficient to allow the micro-capsules to pass.

Several advantages are expected to be obtained from the foregoing formulation of buprenorphine. First, by maintaining a pH of between about 6.4 and 8.0 and most preferably between about 7.4 or 7.8 and 8.0, a strong increase in encapsulation efficiency is obtained. Encapsulation efficiency is the measure of the amount of drug that ends up encapsulated in the micro-capsules as opposed to lost in the aqueous solution. Encapsulation efficiency has been observed to increase to around fifty percent when pH is raised to 7.4 and to increase to above eighty percent when pH increases to 7.8, with even better results observed at a pH of 8.0. The slightly basic conditions are believed to lead to higher encapsulation efficiency because the preferred form of buprenorphine used is a salt of hydrochloric acid. The basic conditions that exist in the aqueous solution outside of the micro-particles will have a repellent effect on the acid salt internal phase of the emulsion or colloid. This will help stabilize the emulsion or colloid and reduce loss of the water soluble buprenorphine to the surroundings.

A substantial fall off in efficiency is noted as pH continues to rise. It is believed that the higher pH adversely effects the PLGA matrix, allowing the internal phase to escape into solution and outweighing the stabilizing effect discussed above.

Although the effect of this procedure on encapsulation efficiency has only been tested with regard to buprenorphine, it is expected that similar results will be obtained when other acid-salts are used as the internal phase of an emulsion or colloid. Given the typical high rates of encapsulation losses, such an increase in efficiency would be significant.

It has also been observed that the present method allows drug to polymer ratios that are quite high without substantial loss of encapsulation efficiency. The drug to polymer ratio is a measure of the amount of oil phase polymer, such as PLGA, that is present relative to the water phase drug. High drug to polymer ratios allows the required dosage of drug to be delivered to the patient in a smaller overall application—i.e., the volume of the injection or other delivery mechanism is smaller for the same amount of drug than would be the case if lower drug to polymer ratios were used. However, increasing the drug to polymer ratio will usually result in greater loss of the drug during encapsulation and thus lower encapsulation efficiency. The ability to vary the drug to polymer ratio without the substantial loss of drug is, therefore, a useful tool to the micro-capsule designer. This would be equally true for other active ingredients, besides pharmaceuticals.

By maintaining the pH of the aqueous solution in which the second emulsion is formed at about 8.0, encapsulation efficiencies of well above eighty percent have been obtained for micro-capsules formed at drug to polymer ratios from 1:20 to 1:2.5. When the drug to polymer ratio increased as high as 1:2, encapsulation efficiency remained at about seventy percent.

A common problem with micro-capsules is that they tend to release a high amount of drug immediately. When the micro-capsules are used to deliver drugs, the patient will receive most of the drugs in an initial burst, rather than at a steady rate over time. This burst effect can be desirable; however, in many contexts, it would be preferable to be able to dose a patient once and allow the drugs to enter his system steadily over time. The same considerations apply to other micro-encapsulation applications. For example, where micro-capsules are used to deliver pesticide, it would often be desirable to be able to apply a pesticide once and allow it to be released into the environment at a constant rate rather than to release it all at once and have it degrade in a matter of days, necessitating a second or third application.

The present invention provides precisely this effect. It has been found that by maintaining the pH of the aqueous solution in which the second emulsion is formed at about 8.0 during formation of the micro-capsules, the active ingredient of the micro-capsules is released at a very steady rate. For example, micro-capsules containing sixty percent by weight of buprenorphine were found to have released approximately 0.6 µg of buprenorphine per milligram of micro-capsule per day for about 155 days. During the initial twenty-five days, the release rate was about fifty percent higher (about 1.0 µg of buprenorphine per milligram of micro-capsule per day). However, after about twenty days, the rate of release became very linear through the end of the observations. Moreover, only about twenty-five percent of the buprenorphine contained in the micro-capsules had been released at the end of 155 day observation period. Very similar result were observed for micro-capsules containing forty percent and thirty percent buprenorphine by weight. There was every reason to believe that the steady rate of release would have continued for far longer than the five months observed.

Similar results were observed using micro-capsules containing five percent by weight buprenorphine. About seventy percent of the drug was released during the first eighty days of observations. During this time period, the rate of release was a very steady 0.8 µg of buprenorphine per milligram of micro-capsule per day, with a very little upward deviation from this rate in the first few days. After about eighty days, the rate of release slowed to about 0.15 µg of buprenorphine per milligram of micro-capsule per day for the remainder of the 155 period, by which time about ninety percent of the drug had been released. Thus, the first seventy percent of the active ingredient was released at a very constant rate, and the remainder of the drug was released at a slower but still relatively constant rate. Similar results were observed for micro-capsules comprising ten and twenty percent by weight of buprenorphine.

These results of the testing performed of the invention are set forth in more detail in the following examples.

EXAMPLES

Example 1

Preparation of Buprenorphine Micro-Capsules to Study the Effect of pH on Encapsulation Efficiency

Preparation of Buprenorphine Micro-Capsules

Six batches (A-F) of biodegradable micro-capsules of buprenorphine were prepared to study the effect of pH on encapsulation efficiency. See FIGS. 1 and 4. Each batch was prepared having the same amount of buprenorphine (five percent drug loading). A PLGA solution was first prepared by dissolving one gram (g) of PLGA in ten milliliters (ml) of dichloromethane. Two hundred microliters (μL) of L-α phosphatidyl choline surfactant were added to the PLGA solution. An aqueous solution of buprenorphine was then prepared by dissolving a specific amount of buprenorphine powder to create batches A-F respectively, as shown in FIG. 1, with 500 ml of deionized water. The aqueous solution of the drug was then emulsified in the PLGA solution. This resulting emulsification was then further emulsified in a 200 ml PVA aqueous solution (0.3% by weight) to provide a water/oil/water emulsion. A pH buffer was introduced to the PVA solution, prior to the second emulsification to achieve the desired pH: 6.4, 7.0, 7.4, 7.8, 8.0, and 8.4, respectively. Separate batches were prepared using the solutions of varying pH. The emulsion was then allowed to stand, with constant stirring, at room temperature (25° C.) to allow the dichloromethane solvent to evaporate, leaving precipitated micro-particles dispersed throughout the PVA solution. The micro-capsules were then collected by centrifugation, rinsed in deionized water, and freeze dried.

Determination of Encapsulation Efficiency

A twenty mg sample from each of batches A-F was taken and dissolved in one ml of dichloromethane. Four ml of methanol were then added to this solution to separate the PLGA from the buprenorphine. The solution was then ultra centrifuged (35,000 rpm for fifteen seconds) to completely separate the precipitated PLGA.

Buprenorphine content was determined using a high performance liquid chromatography (HPLC). The chromatographic system comprised a Waters Model 600 programmable solvent delivery module, Waters Model 717 plus auto sampler, and a Waters Model 996 photodiode array detector all available from the Waters Corp. of Milford, Mass. The chromatography was performed using a Supelcosil C-18 column (5 μm, 4.6×250 mm) available from Supelco, Inc. of Bellefonte, Pa. The carrier fluid or mobile phase used comprised seventy percent by volume phosphate buffer (pH 6.8) and thirty percent by volume acetonitrile, and was passed through the chromatograph column at 1.5 mL per minute. The mobile phase was vigorously purged with helium gas for fifteen minutes prior to use. The eluting peaks were identified using a diode array detector. The concentration of buprenorphine in each sample (drug loading experimental value) was determined by interpolating the peak height to the buprenorphine standard curve. Each experiment was performed in triplicate.

To determine encapsulation efficiency, the drug loading experimental value of each of batches A-F, was then compared to the actual amount of buprenorphine utilized in preparation of each of batches A-F. (i.e., the drug loading theoretical values of five percent).

Results

Encapsulation Efficiency vs. pH

As shown by FIGS. 1 and 4, the following data was obtained upon completion of Experiment 1: A pH of 6.4 resulted in an encapsulation efficiency of about thirty-five percent; a pH of 7.0 resulted in an encapsulation efficiency of about thirty-seven percent; a pH of 7.4 resulted in an encapsulation efficiency of about fifty-nine percent; a pH of 7.8 resulted in an encapsulation efficiency of about eighty-nine percent; a pH of 8.0 resulted in an encapsulation efficiency of about ninety-five percent; and a pH of 8.4 resulted in an encapsulation efficiency of about forty-three percent.

The data obtained thus indicated that encapsulation efficiency was improved when pH was between about 6.4 and 8.0 and maximized between about 7.4 or 7.8 and 8.0. As shown by FIGS. 1 and 4, the efficiency of encapsulation increased from about thirty-five percent to about ninety percent when the pH was increased from 6.4 to 7.8. The maximum efficiency of encapsulation, about ninety-five percent, was achieved at a pH of 8.0

Example 2

The Effect of Drug Loading at a Constant pH on Encapsulation Efficiency and Dissolution

Preparation of Buprenorphine Micro-Capsules

Six batches (G-L) of biodegradable Micro-capsules of buprenorphine, having a drug loading content (i.e., weight drug/weight PLGA) of five percent, ten percent, twenty percent, thirty percent, forty percent, and fifty percent, respectively, were prepared to study the effect of a constant and optimal pH during preparation on encapsulation efficiency and dissolution at different drug loadings. See, FIGS. 2, 3A, 3B, 5 and 6A-7F. Each batch G-L was prepared using the same process set forth in Example 1, up to the formation of the water/oil/water emulsion. At that stage, a pH buffer was introduced to the PVA solution prior to the second emulsification to establish the desired pH of 8.0. Batches G-L were then subjected to solvent evaporation, centrifugation, washing, and freeze drying, as set forth in Example 1 to obtain free flowing powder-like buprenorphine micro-capsules.

Determination of Encapsulation Efficiency

The same procedure relating to encapsulation efficiency, as set forth in Example 1, was then performed on twenty mg samples taken from batches G-L. To determine encapsulation efficiency, the drug loading experimental value of each of batches G-L was compared to the actual amount of buprenorphine utilized in preparation of each of batches G-L (i.e., drug loading theoretical values of five percent, ten percent, twenty percent, thirty percent, forty percent, and fifty percent, respectively).

Results

Encapsulation Efficiency vs. Drug Loading

Figure 5:
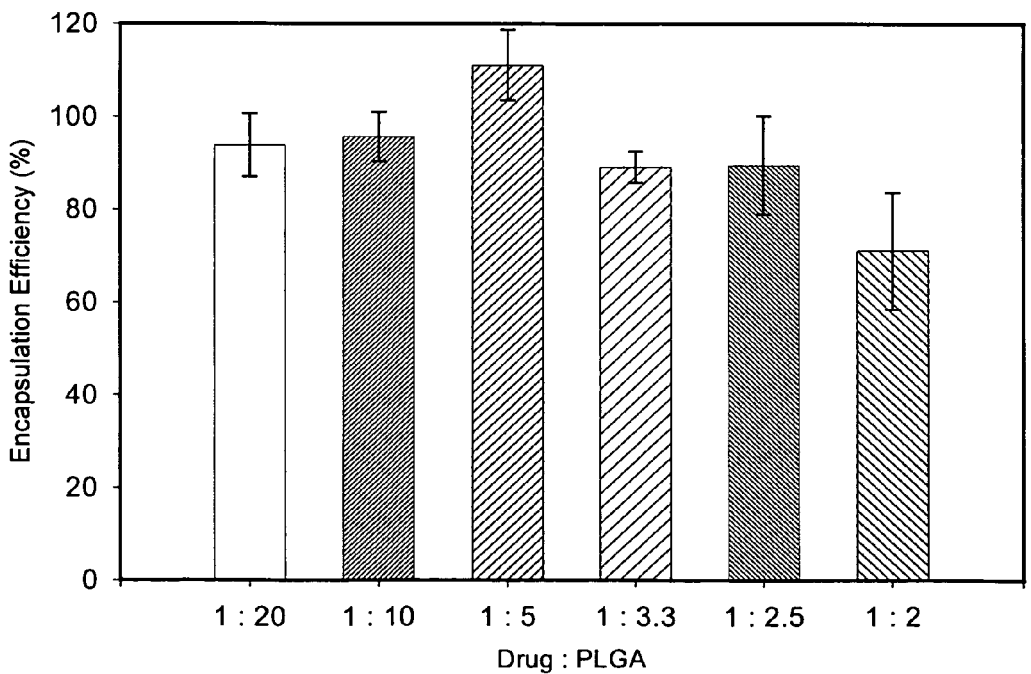
FIG. 5 is a graph illustrating the efficiency of encapsulation achieved under a preferred embodiment of the invention with pH held constant and varying drug loading.
Figure 6A:
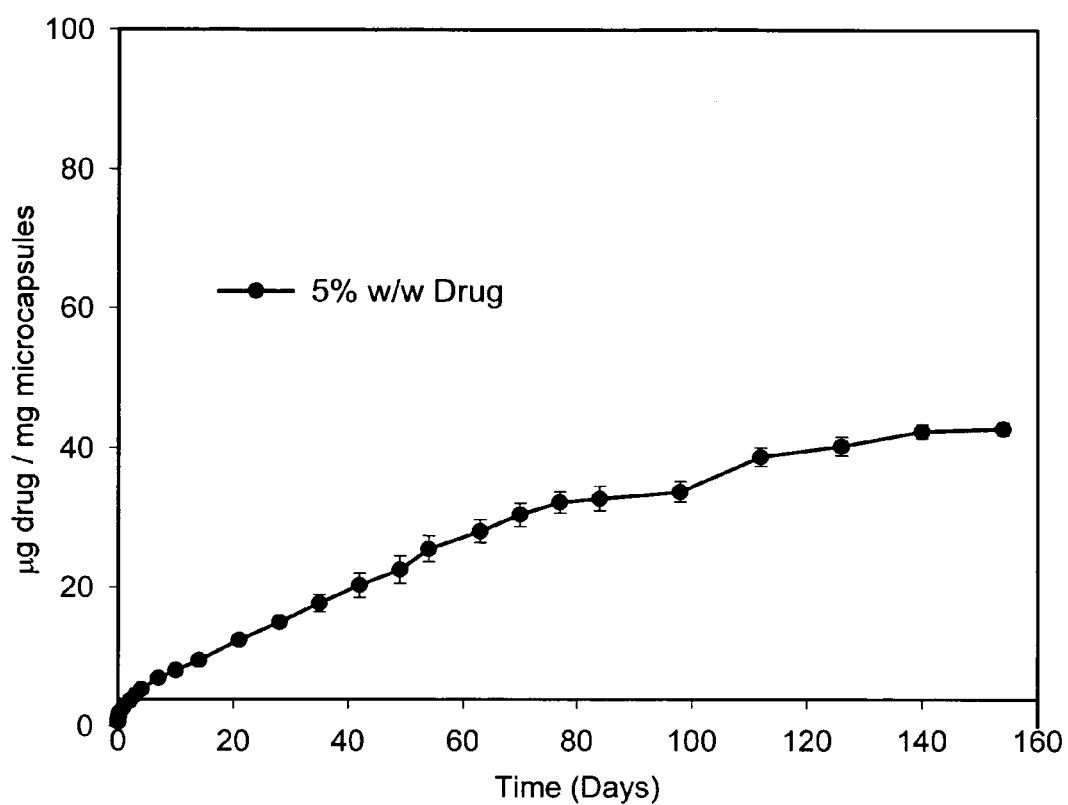
FIG. 6A is a graph illustrating the rate of release of a drug encapsulated at a five percent drug loading rate in micro-capsules according to a preferred embodiment of the invention.
Figure 6B:
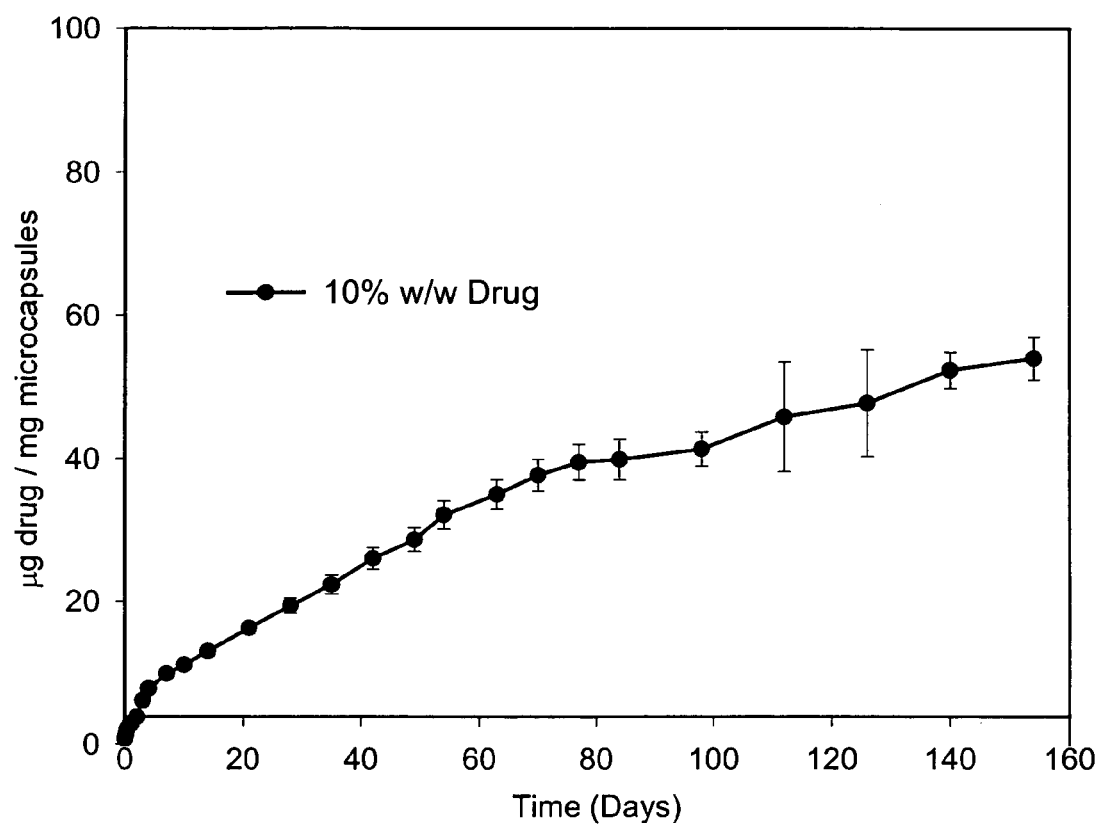
FIG. 6B is a graph illustrating the rate of release of a drug encapsulated at a ten percent drug loading rate in micro-capsules according to a preferred embodiment of the invention.
Figure 6C:
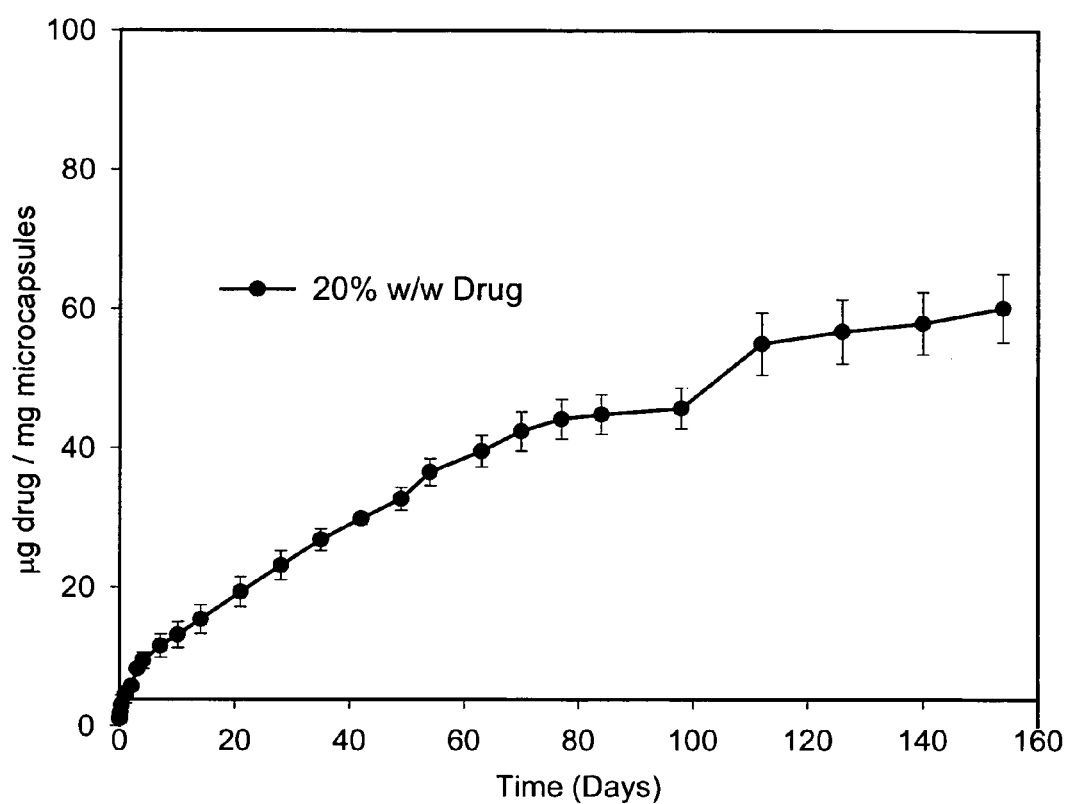
FIG. 6C is a graph illustrating the rate of release of a drug encapsulated at a twenty percent drug loading rate in micro-capsules according to a preferred embodiment of the invention.
Figure 6D:
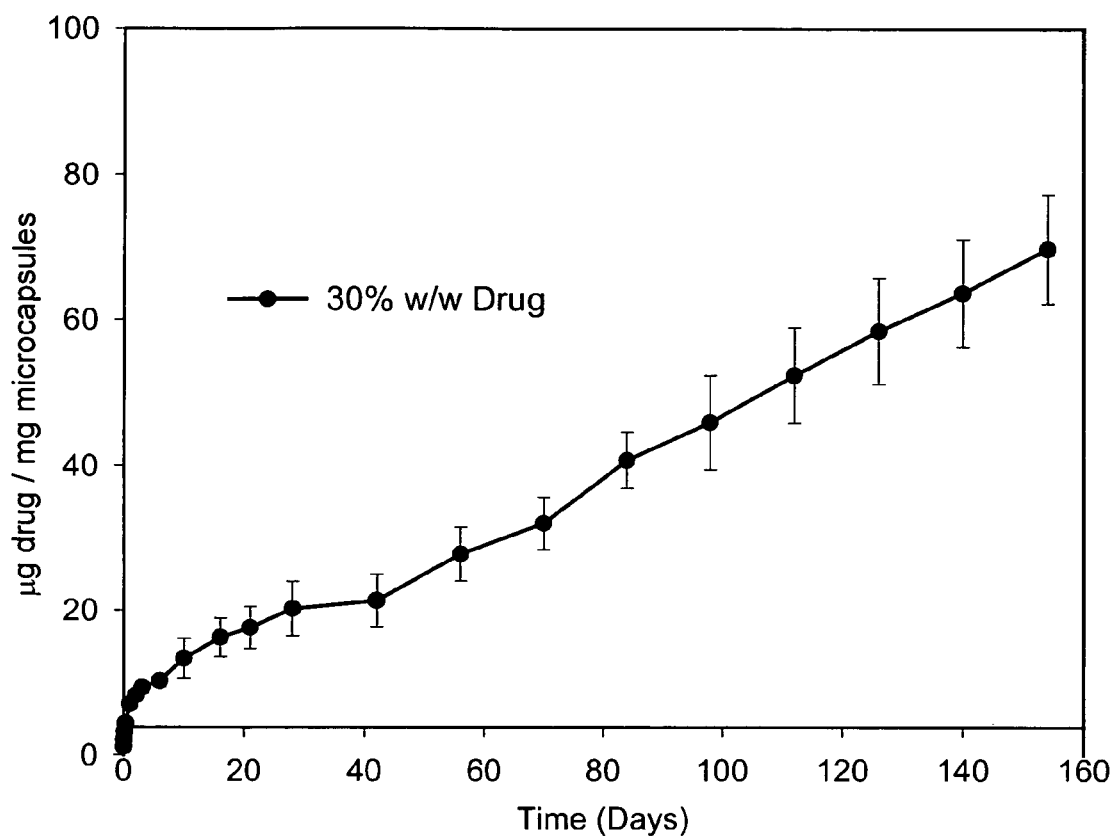
FIG. 6D is a graph illustrating the rate of release of a drug encapsulated at a thirty percent drug loading rate in micro-capsules according to a preferred embodiment of the invention.
Figure 6E:
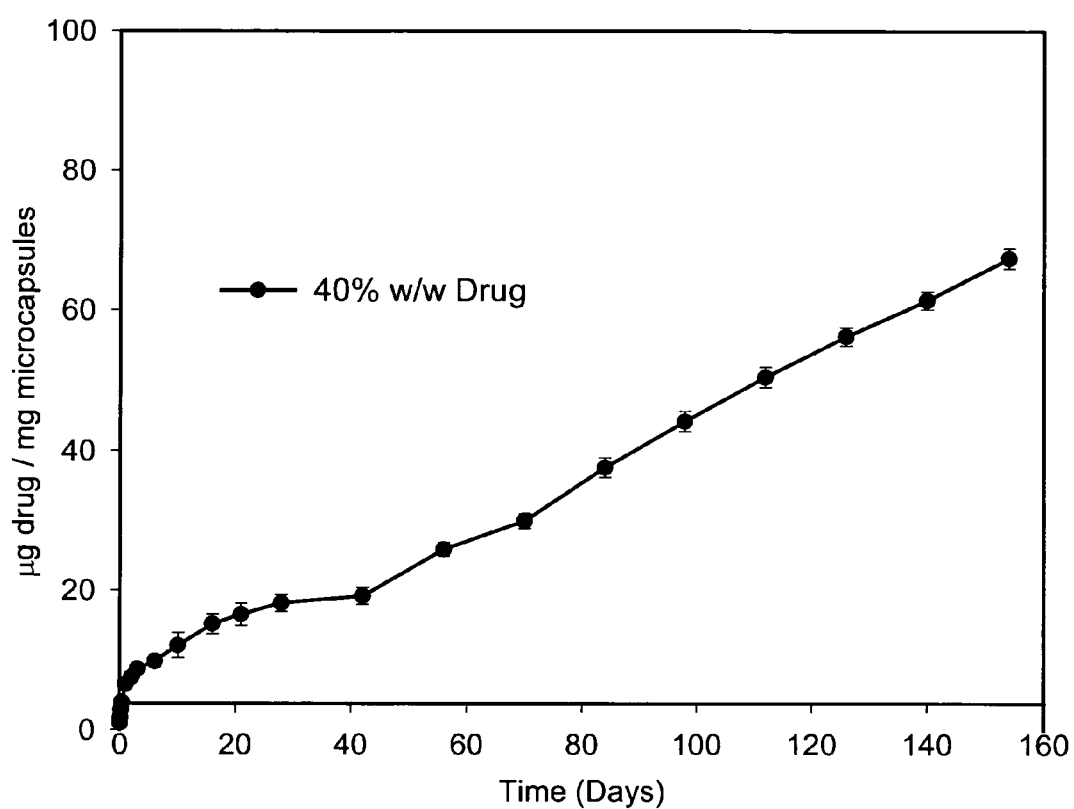
FIG. 6E is a graph illustrating the rate of release of a drug encapsulated at a forty percent drug loading rate in micro-capsules according to a preferred embodiment of the invention.
Figure 6F:
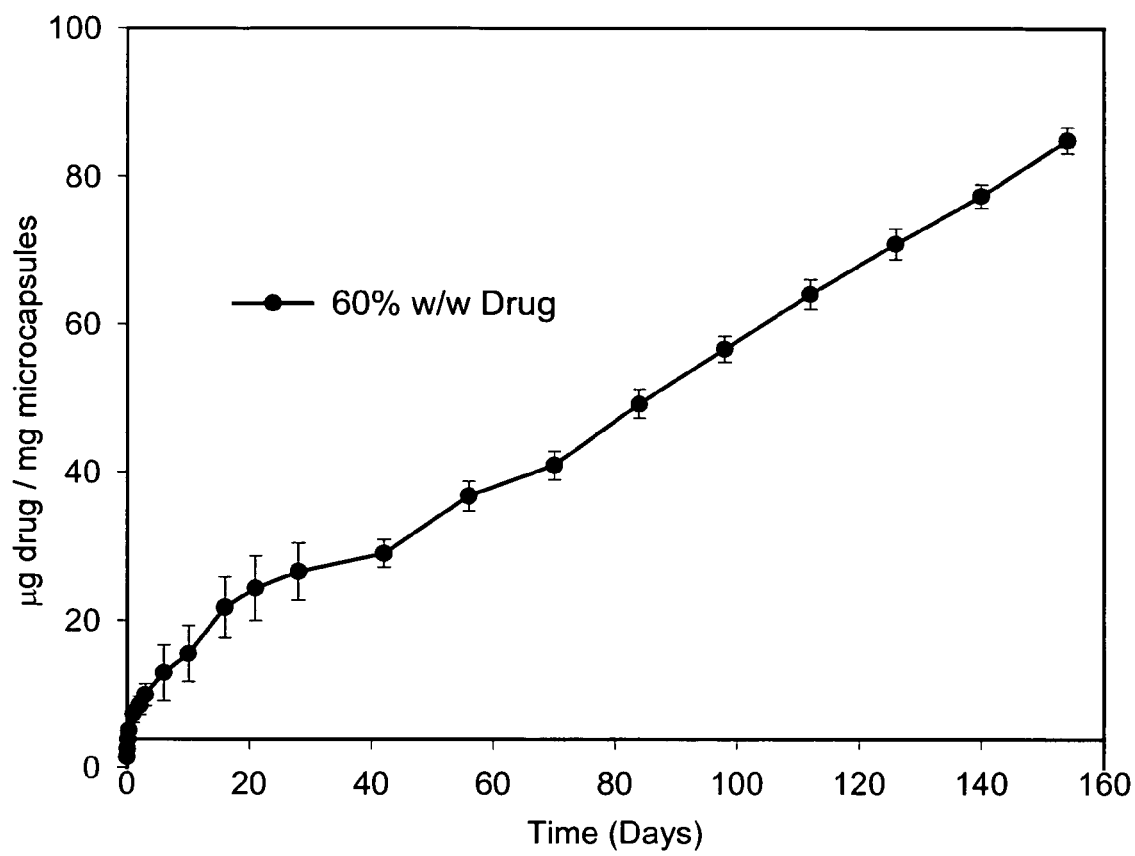
FIG. 6F is a graph illustrating the rate of release of a drug encapsulated at a sixty percent drug loading rate in micro-capsules according to a preferred embodiment of the invention.
Figure 7A:
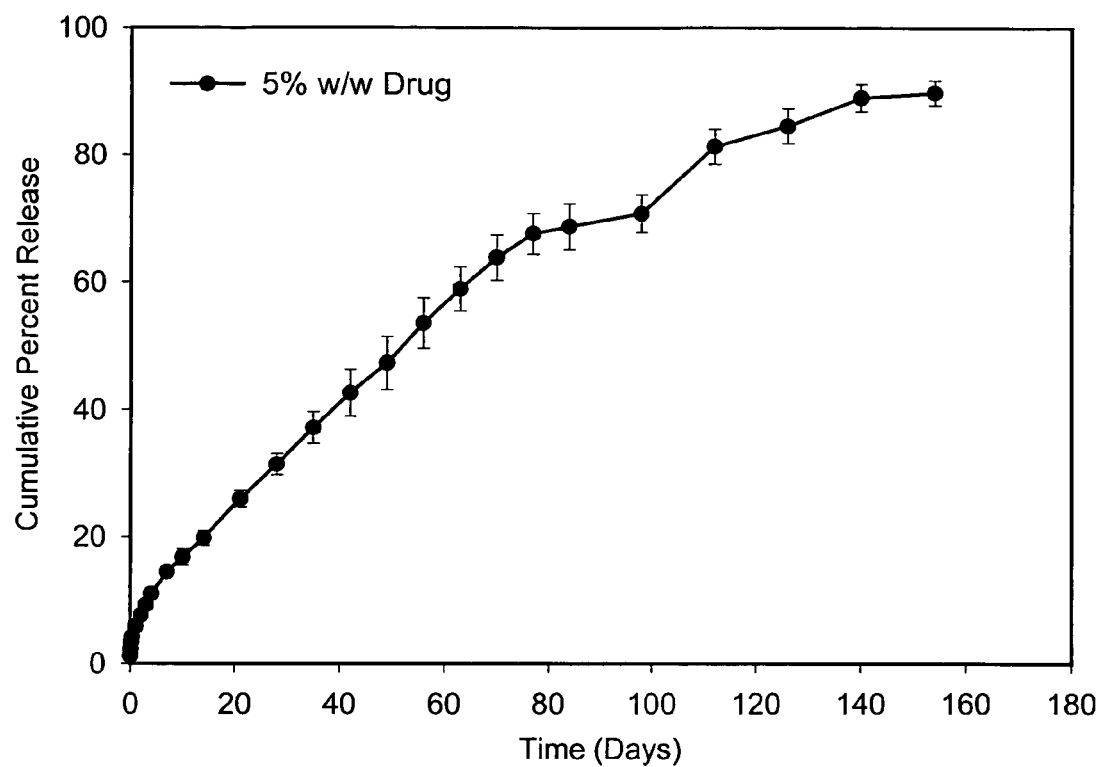
FIG. 7A is a graph illustrating the percentage of drug released, over time, from micro-capsules encapsulated at a five percent drug loading rate according to a preferred embodiment of the invention.
Figure 7B:
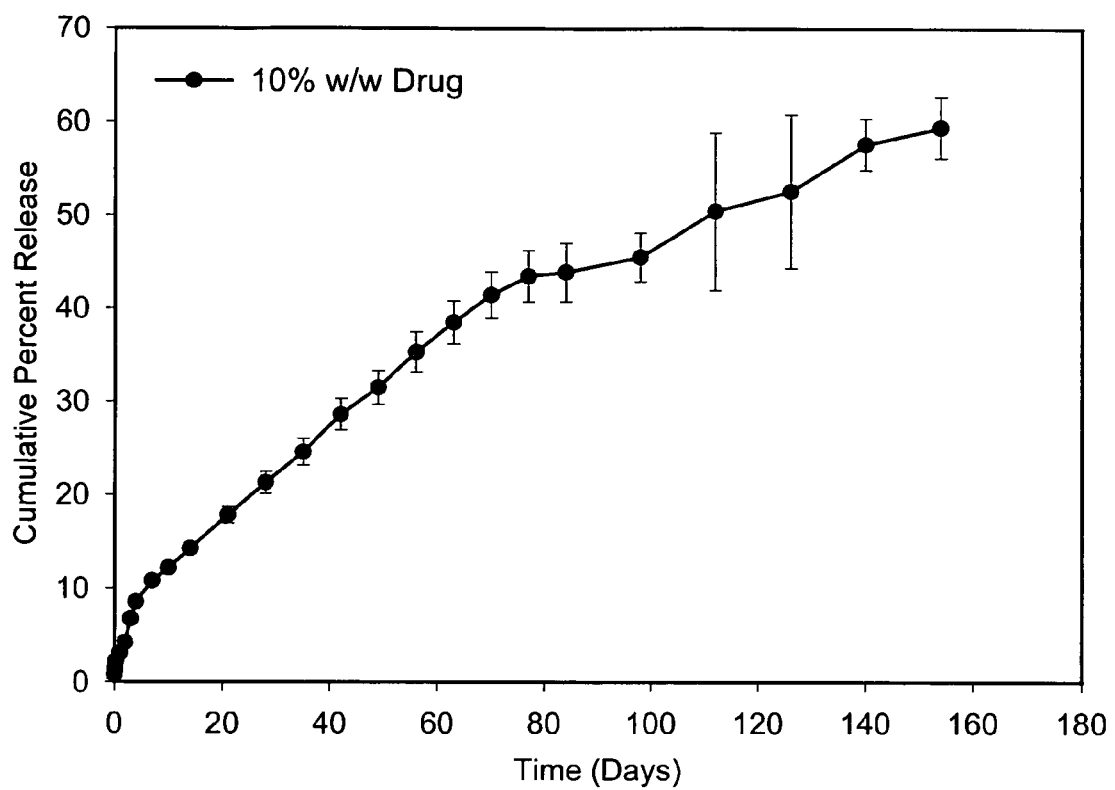
FIG. 7B is a graph illustrating the percentage of drug released, over time, from micro-capsules encapsulated at a ten percent drug loading rate according to a preferred embodiment of the invention.
Figure 7C:
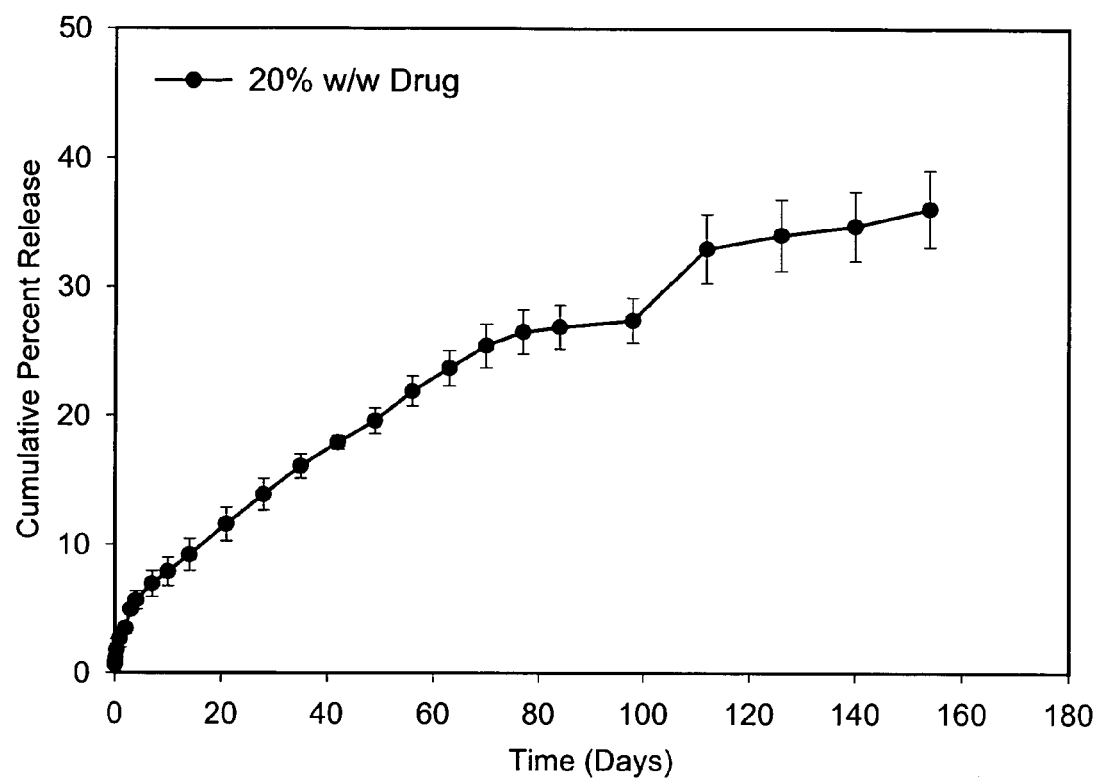
FIG. 7C is a graph illustrating the percentage of drug released, over time, from micro-capsules encapsulated at a twenty percent drug loading rate according to a preferred embodiment of the invention.
Figure 7D:
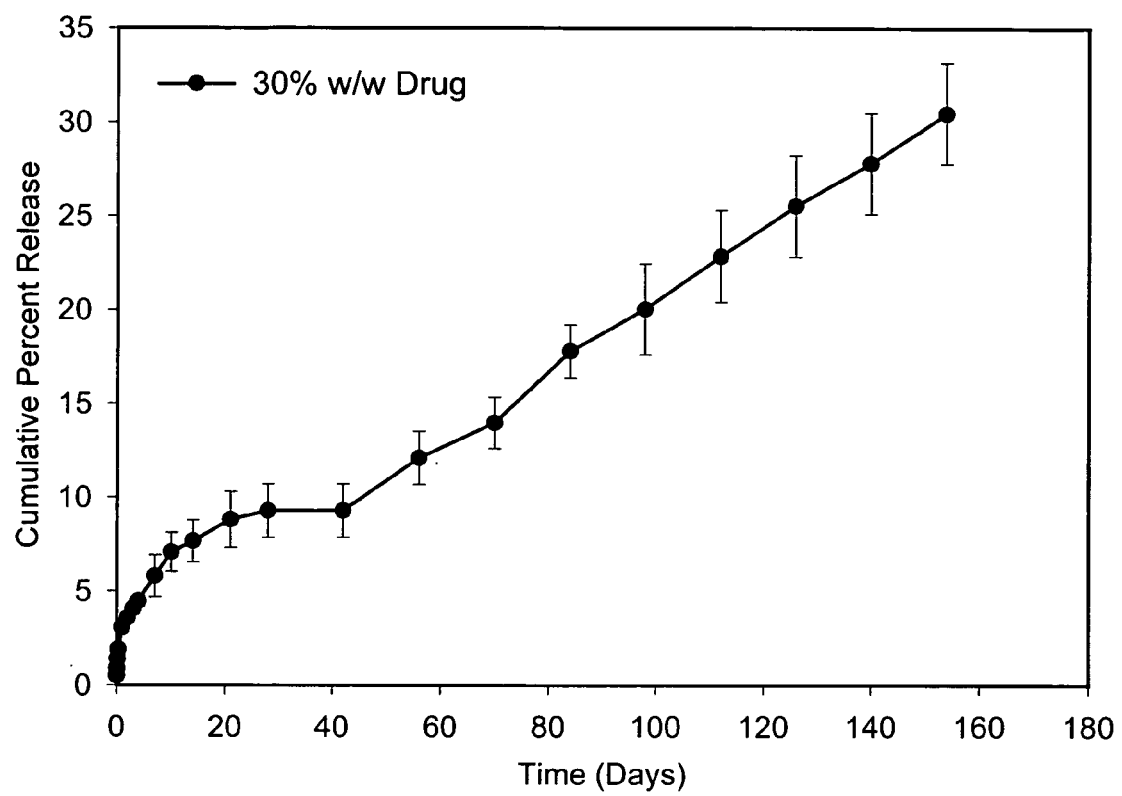
FIG. 7D is a graph illustrating the percentage of drug released, over time, from micro-capsules encapsulated at a thirty percent drug loading rate according to a preferred embodiment of the invention.
Figure 7E:
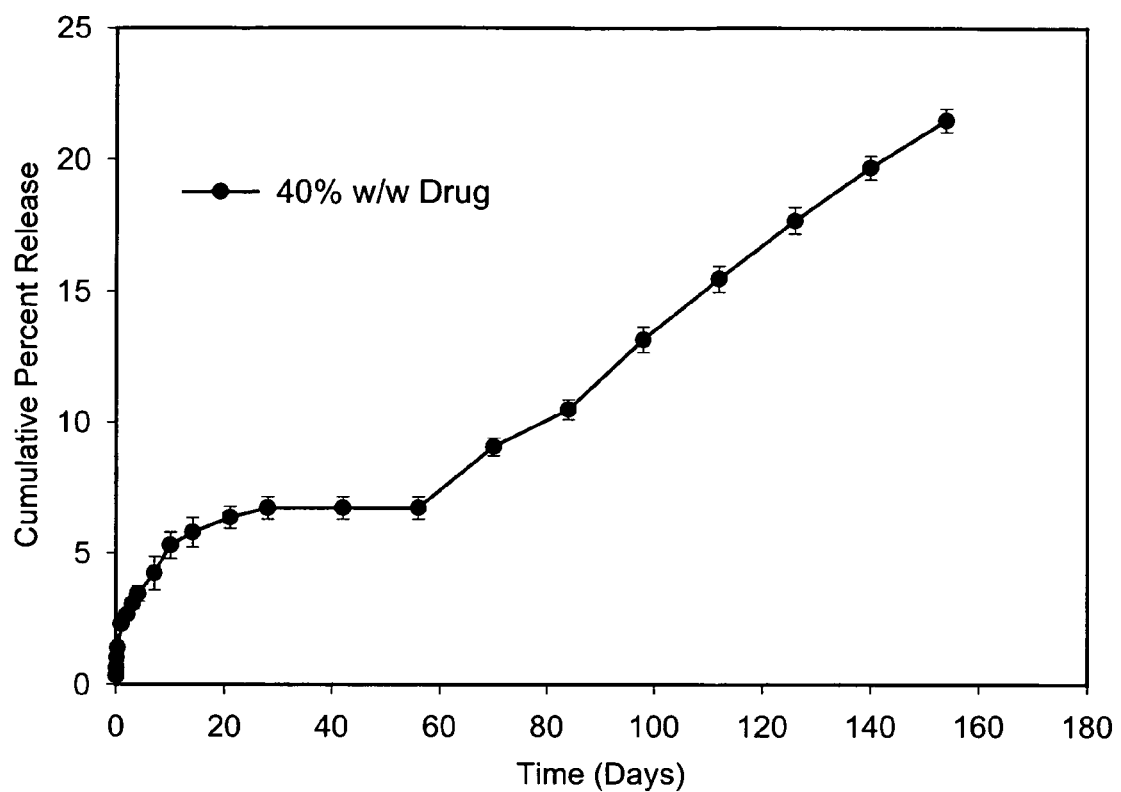
FIG. 7E is a graph illustrating the percentage of drug released, over time, from micro-capsules encapsulated at a forty percent drug loading rate according to a preferred embodiment of the invention.
Figure 7F:
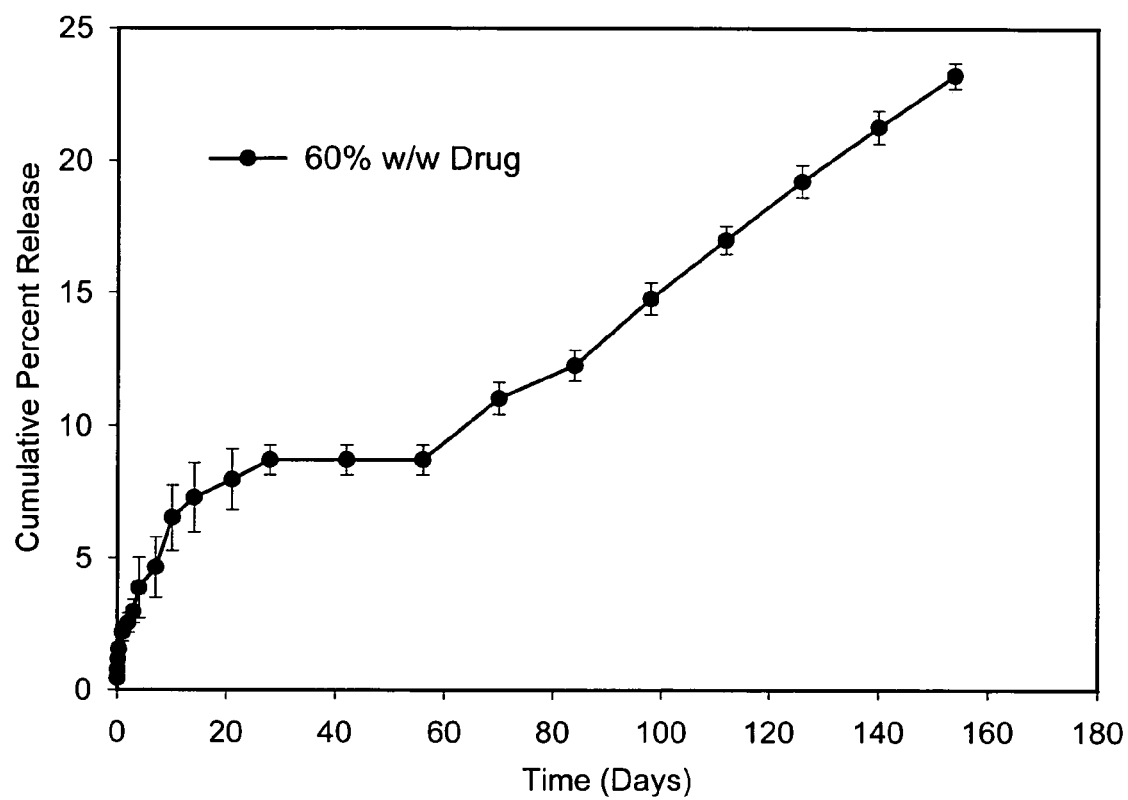
FIG. 7F is a graph illustrating the percentage of drug released, over time, from micro-capsules encapsulated at a sixty percent drug loading rate according to a preferred embodiment of the invention.
Figure 8:
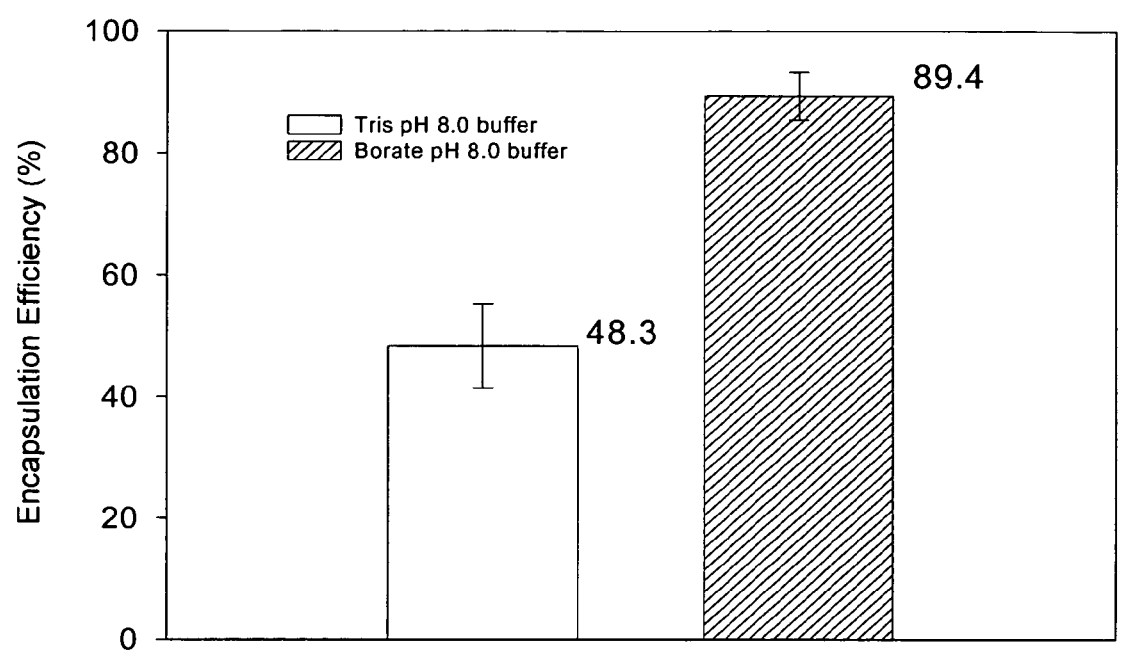
FIG. 8 is graph illustrating the effect of different buffer solutions on the encapsulation efficiency of a preferred embodiment of the invention, at twenty percent drug loading and a constant pH of 8.0.
Figure 9:
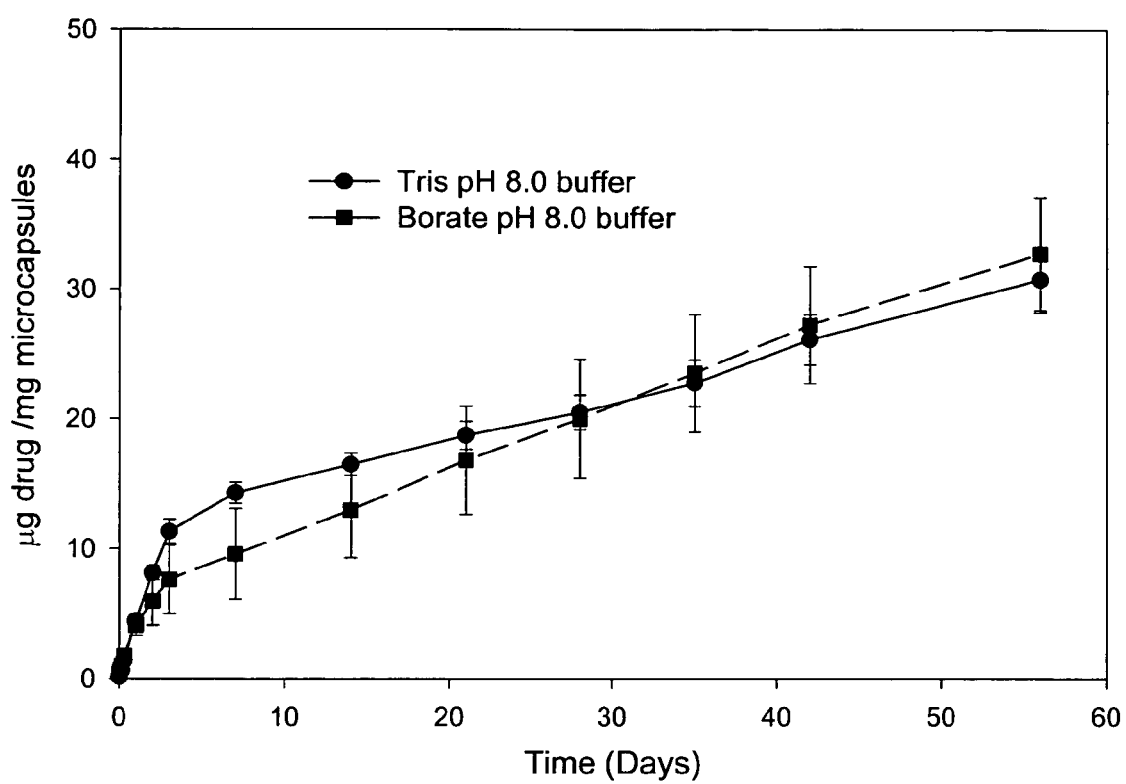
FIG. 9 is graph illustrating the effect of different buffer solutions on the rate of dissolution of micro-capsules formed using a preferred embodiment of the invention at twenty percent drug loading and a constant pH of 7.4.

As shown by FIGS. 2 and 5, the following data was obtained upon completion of Experiment 2: A drug loading of five percent resulted in an encapsulation efficiency of about ninety-five percent; drug loading of ten percent resulted in an encapsulation efficiency of about ninety-seven percent; a drug loading of twenty-percent resulted in an encapsulation efficiency of about one hundred ten percent[1]; drug loading of thirty percent resulted in an encapsulation efficiency of about eighty-seven percent; drug loading of forty percent resulted in an encapsulation efficiency of about eighty-eight percent; and drug loading of fifty percent resulted in an encapsulation efficiency of about seventy percent.

[1] This 110% figure is obviously a data anomaly. However, the results obtained at ten percent and thirty percent drug loading suggest that the efficiency at twenty percent was likely quite high.

As expected, the data indicated a generally negative correlation between encapsulation efficiency and drug loading. However, by maintaining the pH of the aqueous solution in which the second emulsion was formed at a pH of about 8.0, the encapsulation efficiencies remained much higher than expected. For example, as indicated by FIGS. 2 and 5, when the drug loading rates were below twenty-five percent, the encapsulation efficiencies remained well above eighty percent. Furthermore, even at drug loading rates as high as fifty percent, the encapsulation efficiency remained about seventy percent.

In Vitro Dissolution Procedure

Samples from each of batches G-L were subjected to an in vitro dissolution test by placing a ten mg sample of the buprenorphine powder in a ten ml solution of deionized water and phosphate buffer to maintain the desired pH of 7.4, approximately the pH of human blood. The solutions were maintained at 37° C. (body temperature) and stirred constantly at twenty rpm. Samples were collected by centrifuging and then analyzed by HPLC for buprenorphine content.

Results

Dissolution vs. pH with Variable Drug Loading

By maintaining the pH of the aqueous solution in which the second emulsion is formed at about 8.0, significant effects were noted. These effects related to both the dissolution of the buprenorphine (percent release), as well as to the actual amount of buprenorphine released (μg drug/mg capsule). See, FIGS. 3A-3B and FIGS. 6A-7F. As demonstrated by the data, all six batches exhibited similar results: During the first few (two to five) days, a very slight burst effect, in the range of about 0.73 to 1.42 μg drug released per day per milligram of micro-capsule, was noted. By about the fifth or sixth day, the rate of release for all samples had settled down to a fairly constant rate of about 0.41 to about 0.57 μg drug released per day per milligram of micro-capsule. The sixty percent drug loading sample exhibited a slightly higher dissolution rate of about 0.78 μg drug released per day per milligram of micro-capsule.

After about twenty days, the dissolution rate for all samples settled into a rather narrow range between about 0.27 to about 0.47 μg drug released per day per milligram of micro-capsule. This release rate remained fairly constant until about day seventy.

Between about day 70 and day 155, the lower concentration drug loading samples (five to twenty percent) exhibited a diminution in their rates of dissolution, with dissolution rates falling to between about 0.15 to about 0.21 μg drug released per day per milligram of micro-capsule. However, the higher concentration drug loading samples (thirty to sixty percent) all exhibited a slight increase in their rates of dissolution in the same time period, with rates rising to about 0.45 to about 0.52 μg drug released per day per milligram of micro-capsule. Furthermore, at the end of the 155 day period, less than forty percent of the drug had been released for all samples except the five and ten percent loading samples.

Example 3

Effect of Various pH Buffers on Encapsulation Efficiency and Dissolution

Two batches (M and N) of biodegradable buprenorphine micro-capsules were prepared according to the methods set out in Examples 1 and 2. The drug loading rate was twenty percent in both samples, and the pH of the aqueous solution was held at about 8.0 while the second emulsion was formed in each sample. However, a different pH buffer was used. In sample M, the pH buffer was Tris (hydroxymethyl aminomethane) and in sample N, the pH buffer used was borate. Encapsulation efficiency and the dissolution rate were determined in the same manner discussed in Examples 1 and 2.

In sample M, using the Tris pH buffer, an encapsulation efficiency of about 48.3 percent was observed. This is higher than what is typically observed in prior art encapsulation procedures, but lower than the results achieved with the phosphate buffer.

In sample N, the borate pH buffer, an encapsulation efficiency of about 89.4 percent was observed. This is much higher than what is typically observed in prior art encapsulation procedures though still lower than what was achieved using phosphate.

Dissolution was studied for samples M and N in the same manner described in example 2. Ten mg samples of the buprenorphine powder were placed in separate ten ml solution of deionized water and phosphate buffer to maintain the desired pH of 7.4, approximately the pH of human blood. The solutions were maintained at 37° C. (body temperature) and stirred constantly at twenty rpm. Samples were collected by centrifuging and then analyzed by HPLC for buprenorphine content.

In sample M, using the Tris buffer, an initial dissolution rate of about 3.15 μg drug released per day per milligram of micro-capsule was noted during days 1-5. From day 5 to day 106, when this experiment ended, a fairly constant dissolution rate of about 0.32 μg drug released per day per milligram of micro-capsule was observed.

In sample N, using the borate buffer, an initial dissolution rate of about 2.03 μg drug released per day per milligram of micro-capsule was noted during days 1-5. From day 5 to day 70, a very constant dissolution rate of about 0.50 μg drug released per day per milligram of micro-capsule was observed.

While the invention has been described in terms of its preferred embodiment, other embodiments will be apparent to those of skill in the art from a review of the foregoing. Those embodiments as well as the preferred embodiments are intended to be encompassed by the scope and spirit of the following claims.

We claim:

1. A method of preparing micro-capsules comprising:
   a. emulsifying a first aqueous solution comprising buprenorphrine into a polymer solution comprising a polymer and a polymer solvent to create a water in oil emulsion, wherein said polymer comprises poly(lactide-co-glycolide acid);
   b. providing a second aqueous solution wherein the pH of said second aqueous solution is adjusted to between about 7.4 and about 8.0 with phosphate, Tris, or borate buffer;
   c. emulsifying said water in oil emulsion in said second aqueous solution to create a water in oil in water emulsion wherein the pH of the water in oil in water emulsion is maintained between about 7.4 and about 8.0 throughout the emulsifying process;
   d. precipitating micro-capsules by evaporating said polymer solvent from said water in oil in water emulsion;
   wherein the micro-capsules have an encapsulation efficiency of at least about seventy percent, and a steady release rate over at least one month.

2. A method of preparing micro-capsules according to claim 1 wherein said polymer solvent comprises dichloromethane.

3. A method of preparing micro-capsules according to claim 1 wherein the pH of the emulsion of step b) is maintained at between about 7.8 and about 8.0 throughout the emulsifying process.

4. A method of preparing micro-capsules according to claim 1 wherein said polymer solution further comprises a surfactant.

5. A method of preparing micro-capsules according to claim 4 wherein said surfactant comprises about 0.005 percent by weight of said polymer solution.

6. A method of preparing micro-capsules according to claim 5 wherein said surfactant comprises L-α-phosphatidyl choline.

7. A method of preparing micro-capsules according to claim 1 wherein said second aqueous solution further comprises a surfactant.

8. A method of preparing micro-capsules according to claim 7 wherein said surfactant comprises about 0.3 percent by weight of said second aqueous solution.

9. A method of preparing micro-capsules according to claim 8 wherein said surfactant comprises polyvinyl alcohol.

10. A method of preparing micro-capsules according to claim 1 wherein said buprenorphine is provided in the form of an acid salt.

11. A method of preparing micro-capsules according to claim 10 wherein said acid is hydrochloric acid.

12. A method of preparing micro-capsules according to claim 1 wherein the ratio of buprenorphine to polymer is between about 1:20 and about 1:2.

13. A method of preparing micro-capsules according to claim 12 wherein the pH of the emulsion of step b) is maintained at between about 7.8 and about 8.0 throughout the emulsifying process.

14. A method of preparing micro-capsules according to claim 12 having an encapsulation efficiency of at least about eighty percent.

15. A method of preparing micro-capsules according to claim 14 wherein the pH of the emulsion of step b) is maintained at between about 7.8 and about 8.0 throughout the emulsifying process.

16. A method of preparing micro-capsules comprising
  a. emulsifying a first aqueous solution comprising an acid salt of a water soluble active ingredient into a polymer solution comprising a polymer and a polymer solvent to create a water in oil emulsion, wherein said polymer comprises poly(lactide-co-glycolide acid);
  b. providing a second aqueous solution wherein the pH of said second aqueous solution is adjusted to between about 7.4 and about 8.0 with phosphate, Tris or borate buffer;
  c. emulsifying said water in oil emulsion in said second aqueous solution to create a water in oil in water emulsion wherein the pH of the water in oil in water emulsion is maintained between about 7.4 and about 8.0 throughout the emulsifying process;
  d. precipitating micro-capsules by evaporating said polymer solvent from said water in oil in water emulsion;
  wherein the micro-capsules have an encapsulation efficiency of at least about seventy percent, and a steady release rate over at least one month.

17. A method of preparing micro-capsules according to claim 16 wherein said polymer solvent comprises dichloromethane.

18. A method of preparing micro-capsules according to claim 16 wherein the emulsion of step b) is maintained at between about 7.8 and about 8.0 during the emulsifying process.

19. A method of preparing micro-capsules according to claim 16 wherein said second aqueous solution further comprises a surfactant.

20. A method of preparing micro-capsules according to claim 19 wherein said surfactant comprises about 0.3 percent by weight of said second aqueous solution.

21. A method of preparing micro-capsules according to claim 20 wherein said surfactant comprises polyvinyl alcohol.

22. A method of preparing micro-capsules according to claim 16 wherein said acid is hydrochloric acid.

23. A method of preparing micro-capsules according to claim 16 wherein the ratio of active ingredient to polymer is between about 1:20 and about 1:2.

24. A method of preparing micro-capsules according to claim 23 wherein the emulsion of step b) is maintained at between about 7.8 and about 8.0 during the emulsifying process.

25. A method of preparing micro-capsules according to claim 23 having an encapsulation efficiency of at least about eighty percent.

26. A method of preparing micro-capsules according to claim 25 wherein the emulsion of step b) is maintained at between about 7.8 and about 8.0 during the emulsifying process.

27. A method for treating a patient, comprising:
  a. emulsifying a first aqueous solution comprising at least one of a water soluble active ingredient and an acid salt of a water soluble active ingredient into a polymer solution comprising a polymer and a polymer solvent to create a water in oil emulsion, wherein said polymer comprises poly (lactide-co-glycolide acid);
  b. providing a second aqueous solution wherein the pH of said second aqueous solution is adjusted to between about 7.4 and about 8.0 with phosphate, Tris or borate buffer;
  c. emulsifying said water in oil emulsion in said second aqueous solution to create a water in oil in water emulsion wherein the pH of the water in oil in water emulsion is maintained between about 7.4 and about 8.0 throughout the emulsifying process;
  d. precipitating micro-capsules by evaporating said polymer solvent from said water in oil in water emulsion;
  e. washing the micro-capsules with deionized water;
  f. dispersing at least one micro-capsule in a saline solution; and
  g. injecting the saline solution containing the at least one micro-capsule into the patient,
  wherein the micro-capsules have an encapsulation efficiency of at least about seventy percent, and a steady release rate over at least one month.

28. The method of claim 27, wherein the water soluble active ingredient is an analgesic.

29. The method of claim 28, wherein the analgesic is buprenorphine.

30. The method of claim 27, wherein the patient suffers from at least one of opiate addiction and chronic pain.

31. The method of claim 27, wherein the burst release of the water soluble active ingredient or acid salt of a water soluble active ingredient from the at least one micro-capsule after injection into the patient is less than five percent of the water soluble active ingredient or acid salt of a water soluble active ingredient contained within said microcapsule.

32. A method of preparing micro-capsules according to claim 27 wherein said polymer solvent comprises dichloromethane.

33. A method of preparing micro-capsules according to claim 27 wherein the emulsion of step b) is maintained at between about 7.8 and about 8.0 during the emulsifying process.

34. A method of preparing micro-capsules according to claim 33 wherein said surfactant comprises about 0.3 percent by weight of said second aqueous solution.

35. A method of preparing micro-capsules according to claim 27 wherein said second aqueous solution further comprises a surfactant.

36. A method of preparing micro-capsules according to claim 35 wherein said surfactant comprises polyvinyl alcohol.

37. A method of preparing micro-capsules according to claim 27 wherein said acid is hydrochloric acid.

38. A method of preparing micro-capsules according to claim 37 having a encapsulation efficiency of at least about eighty percent.

39. A method of preparing micro-capsules according to claim 27 wherein the ratio of the one of a water soluble active ingredient and an acid salt of a water soluble active ingredient to polymer is between about 1:20 and about 1:2.

40. A method of preparing micro-capsules according to claim 39 wherein the emulsion of step b) is maintained at between about 7.8 and about 8.0 during the emulsifying process.

41. A method of preparing micro-capsules according to claim 40 wherein the emulsion of step b) is maintained at between about 7.8 and about 8.0 during the emulsifying process.

42. A method of preparing micro-capsules comprising:
   a. emulsifying a first aqueous solution comprising buprenophrine into a polymer solution comprising a polymer and a polymer solvent to create a water in oil emulsion, wherein said polymer comprises poly(lactide-co-glycolide acid);
   b. providing a second aqueous solution wherein the pH of said second aqueous solution is adjusted to between about 7.4 and about 8.0 with phosphate, Tris, or borate buffer;
   c. emulsifying said water in oil emulsion in said second aqueous solution to create a water in oil in water emulsion wherein the pH of the water in oil in water emulsion is maintained between about 7.4 and about 8.0 throughout the emulsifying process;
   d. precipitating micro-capsules by evaporating said polymer solvent from said water in oil in water emulsion; and
   e. separating said microcapsules,
   wherein the micro-capsules have an encapsulation efficiency of at least about seventy percent, and a steady release rate.

43. The method of claim 42, wherein the micro-capsules have a steady release rate over at least one month.

44. The method of claim 42, wherein the micro-capsules have a steady release rate over up to about five months.

45. The method of claim 42, wherein the step of separating said microcapsules comprises:
   a. centrifuging the water in oil in water emulsion containing the precipitated micro-capsules in at least one centrifuge tube such that the micro-capsules accumulate at the bottom of the at least one centrifuge tube;
   b. pouring any remaining liquid off of the accumulated micro-capsules;
   c. washing the micro-capsules with deionized water; and
   d. freeze-drying the micro-capsules.

* * * * *